June 7, 1932.  P. SUBKOW  1,862,069
RECTIFICATION COLUMN
Filed Sept. 6, 1927
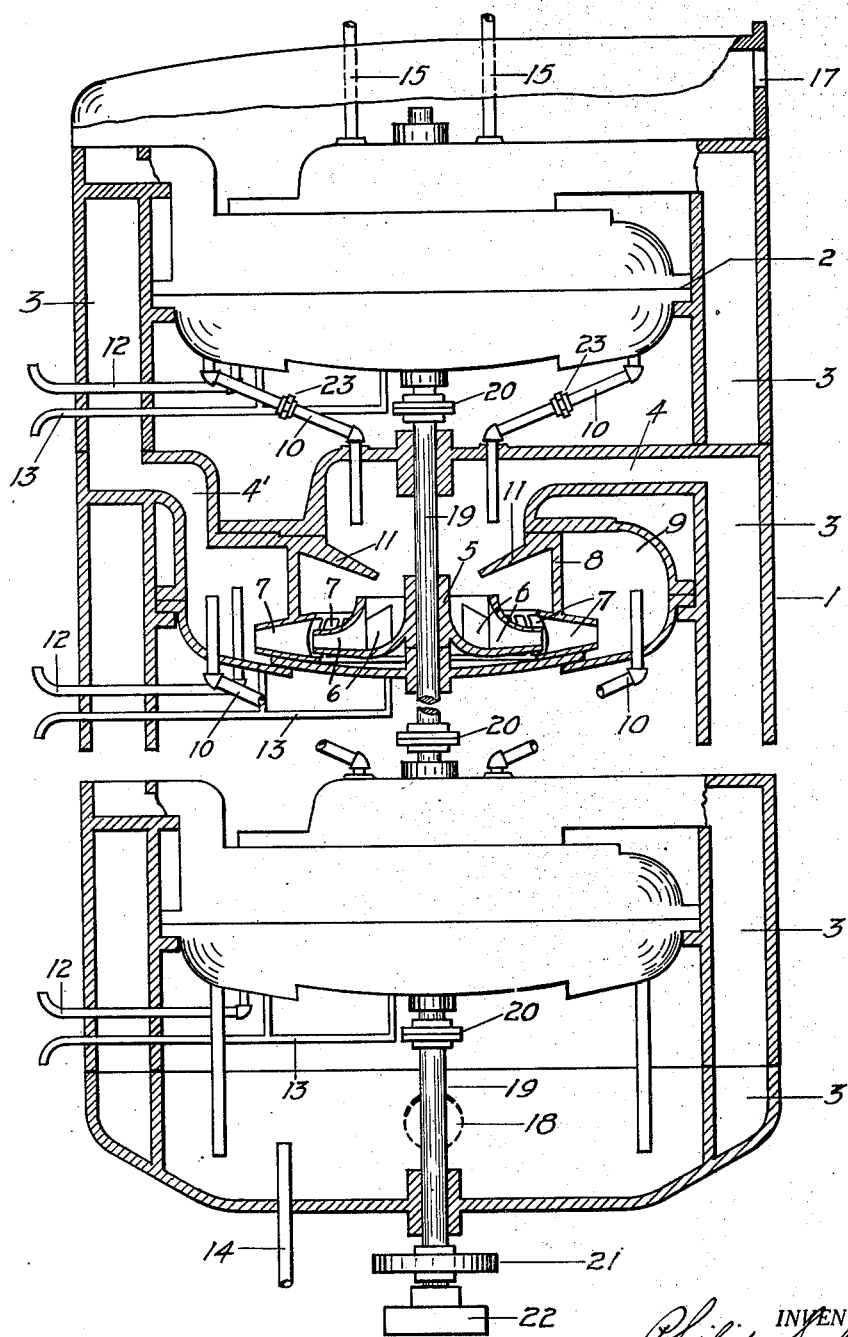
INVENTOR.
Philip Subkow Patented June 7, 1932

1,862,069

UNITED STATES PATENT OFFICE

PHILIP SUBKOW, OF LOS ANGELES, CALIFORNIA, ASSIGNOR TO UNION OIL COMPANY OF CALIFORNIA, OF LOS ANGELES, CALIFORNIA, A CORPORATION OF CALIFORNIA

RECTIFICATION COLUMN

Application filed September 6, 1927. Serial No. 217,789.

It is well known that in an apparatus for the contacting of a vapor with a liquid whereby the vapor is forced to travel through a liquid-vapor contact means such as the so-called "filled" column, or caused to pass through pools of condensate such as in the "bubble type" column, the back pressure, due to the resistance to the passage of vapor or gas through the baffling means and/or against the head of liquid in the column as, for instance, through pools of scrubbing liquid or condensate in said column, forms a definite limitation on the initial pressure of the vapors or gas, since they must have enough pressure to force them against this resistance. When such a column is used in the process of treating vapors by contact with a condensate formed from said vapors, it functions as a rectification column to rectify the vapors to produce a segregation and purification of the components thereof.

In distillation, the higher the pressure, the greater the distillation temperature and the more heat is required for distillation. In some cases such as in the distillation of decomposible bodies such as mineral lubricating oils the distillation temperature must not exceed the temperature at which decomposition sets in; consequently, very high vacuums ranging from 1 m. m. pressure are employed. In vacuum distillation the rectification column, or other condensing means, is usually placed between the vaporizing means and the vacuum generating means. The back pressure of the column will determine the amount of vacuum which may be maintained over the vaporizing surface. This back pressure depends on the size of the rectifying column and the depth of liquid maintained on the plates, the volume and velocity of the vapors passed through, etc. Even if a perfect vacuum is maintained by the vacuum pump, the actual distillation pressure can never be less than this back pressure, which may in effect entirely overcome the vacuum generated by the vacuum pump and make impossible vaporization in vacuum. Consequently, distillation under any considerable vacuum never employs a rectification tower, and depends entirely on crude fractional condensation for the purification and segregation of the components of the vapor. This is especially true where the vacuum is of the order of 200 m. m. pressure or less. A single plate may cause a back pressure of 20 to 25 m. m., and a column usually exceeds ten plates. A column is impossible in modern systems employing 25 m. m. or less pressure. It is the purpose of this invention to provide a process and apparatus which would allow the efficient contact of vapors or gases and liquids, such as, for instance, employed in rectification without any considerable back pressure. It is thus particularly adapted for the production of lubricating oils under very high vacuum or other vacuum distillations, where the back pressure of the rectifying column makes its use impossible.

This invention pertains to an apparatus for the treatment of vapors or gases under such conditions that the pressure of the vapors entering the process or apparatus is not considerably more than the outgoing vapors or gases, and is more particularly directed to a process of rectifying vapors by counter-current contact with a condensate formed from said vapors. More particularly it is directed to an apparatus for rectifying vapors under high vacuum, wherein the normal back pressure of the rectification column necessitates a vaporization pressure greater than the desired pressure.

This invention pertains to a column with substantially no back pressure, that is, the pressure at the top and the bottom of the column is substantially the same, and one in which a practically uniform pressure is maintained throughout the column. Thus, when employed in vacuum distillation, vaporization may occur at substantially the same vacuum as is caused by the vacuum generating means.

This invention, in one of its aspects, comprises means for forcing the vapor against the back pressure of the column by means of an extraneous force, that is, by providing an extraneous pressure other than the natural pressure of the vapor resulting from their generation. In another of the broad aspects, it comprises means for forcing the vapors or gases through pools of condensate or other liquid by the imposition of an extraneous pressure on the vapor to force the vapor from one pool through another, overcoming in successive stages the individual back pressure of the various pools. In the embodiment herein disclosed the apparatus comprises a plurality of mechanical vapor pumps, each pump forming an integral portion of the liquid vapor contact section to force the vapors from a lower plate to bubble through the liquid collected on the upper plate. In the embodiment herein disclosed the vapor pumps are of the rotary type.

The invention will be better understood by referring to the accompanying drawing which shows a vertical partial section of the tower illustrating three plates. Obviously a greater or less number of plates could be employed.

The figure shows a vertical elevation partly broken away and partly in section, showing two upper plates, the lowest plate and bottom of the column. One of the plates shown is in section. In this figure (1) is the column. The column is comprised of a plurality of plates or sections (2) that is liquid and vapors contact units. These plates or sections as herein described permit of the interaction of liquids and vapors for purposes of rectification. Each section is of similar construction, making the plates interchangeable and the tower expansible. Each section comprises a mechanical pump, that is, a vapor pump operated by mechanical means particularly shown as a centrifugal jet pump and also comprises an annular passage (3) for vapors from the next lower plate. (4) is a passage for vapors from passageway (3) into the jet pump. (5) is a rotor carrying nozzles or vanes (6) disposed circumferentially of the rotor. (7) are stationary nozzles or vanes disposed circumferentially in casing (8) and cooperating with nozzles (6). (9) is an annular trap or separating chamber receiving the liquid from nozzles (7) and allowing the separation of vapors and thus acting as a liquid container. The vapors pass into (7), then into (9) and thence through conduit (4') to the annular passageway (3). Liquid from separating chamber (9) is returned to the next lower plate by downcomers (10). This liquid gravitates onto baffles (11) to be directed in the rotor (5). (12) are lines for drawing off condensates when this is desired. (13) is a drain line for cleaning out the tower and is tapped into the bottom of the plate 2 behind the line on which the section is taken. (14) is a condensate line for withdrawing the heaviest fractions from the tower. (15) are reflux lines for returning reflux to the top plate. (17) is a vapor line for removing uncondensed vapors from the tower. (18) is a vapor admission connection connected into annular passage (3) of the bottom section. (19) is a shaft in sections mounted by flanges (20) carrying the rotors of the various plates. (21) is the means for rotating the shaft. This may be a gear or belt pulley. (22) is a foot bearing for the shaft. The downcomers (10) are connected by union (23). It will be observed that the tower is composed of similar sections.

The operation of the tower will be understood from the above. Vapors enter the tower at any place, for instance, via (18), into the lowest section. They pass into the annular passageway (3) to the plates. The liquid returning from the section immediately above the upper plate gravitates via (10) onto baffle (11) and is directed to rotor (5). The rotation of this rotor forms a jet directed by nozzle or vanes (6) into nozzle or vanes (7), which act as diffusers. This causes a suction on vapor in passage (3) and forces the vapors together with the liquid into the separation chamber (9), where the vapors are separated and sent in the annular passageway (3) via (4'). The vanes (7) are formed circumferentially of (8) and there is, therefore, a vapor liquid injection at a plurality of places in chamber (9) to cause an intimate contact between a plurality of streams of said vapor and said liquid and with the liquid in the liquid container 9. A definite and predetermined head of liquid is maintained in this annular liquid container or trap by downcomers (10). Intimate contact and equilibrium is established by this means and rectification results. The amount of work done by the rotor is small, due to the fact that the back pressure in each section against which the vapors are pumped is small. The work is merely that necessary to overcome the frictional resistance and the head of liquid in (9). It will thus be seen that the back pressure in the column is made null since this is overcome by the mechanical work of the pumps.

The specific type of centrifugal jet pump is that shown in the Thoens U. S. Patent 864,811. It is obvious that many different types of pumps may be employed without departing from the subject of the invention. Thus other types of blower such as steam jets or blowers either of the rotary or reciprocating type may be employed and the circulating liquid returned either mixed with the vapors or independently to the liquid containers on each plate. The pumps may be positioned outside of the plates and connected thereto by conduits. Heating or cooling coils may be provided on each plate in the liquid compartment.

It will be observed that the tower is essentially a "bubble" plate column of a novel design, vapors coming from the next lower plate bubble through condensate on the said plate and condensate from the next upper plate is introduced to the condensate on the plate in question. It will be observed that the suction caused by the centrifugal pump will cause a drag on the vapors and force the vapors through the liquid in the annular chamber to overcome the back pressure of the construction. There will then be practically no pressure difference between the space (4) and the space (4') of each section. The vapors are drawn by means of the suction effect of the jet and are compressed to the amount sufficient to overcome the back pressure. On being ejected through the vane (7) they immediately expand upward through the liquid in the annular liquid container (9) to automatically release the pressure. This pressure is also reduced by condensation and cooling. The result is a series of contacts between condensate and vapors at a substantially uniform pressure, wherein the pressure of the inlet and outlet of the contacting chamber is maintained substantially constant.

It will be observed that by independently operating the several pumps, such as by independent application of a rotary force to each pump or by proper design of the several pumps, any desired pressure variation may be obtained. Thus, instead of keeping the pressure substantially constant, the pressure through the tower may be increased or decreased in any desired degree, as will be understood by those skilled in the art. Thus the tower itself may act as a vacuum pump, in which case the pressure through the tower may increase instead of being constant or decreasing. Each suction stage constituting both a rectification unit and a stage of the vacuum pump, stages of vacuum may be employed during and after the final condensation stage of the distillation process.

The above description is not to be taken as limiting my invention, but merely illustrative of the invention which I claim to be.

Claims:

1. A rectification device comprising a plurality of centrifugal jet pumps, means for maintaining a plurality of bodies of liquid, means including said jet pumps for passing liquid from one body to a subsequent body and means including said jet pumps for passing vapors to establish a counter-current flow of vapors and liquid through said rectification device.

2. In combination a plurality of liquid vapor contact plates in superposed relationship, each comprising a liquid container, a vapor and a liquid draw-off from said container, a centrifugal jet pump, means to pass vapors from the next lower liquid container to said jet pump, means to pass liquid from the next upper liquid container to said jet pump.

3. A liquid and vapor contact device, comprising an annular separating chamber, a plurality of stationary nozzles positioned in said chamber, a rotor comprising a plurality of nozzles cooperating with said stationary nozzles, means for withdrawing vapor from said separating chamber and means for maintaining a uniform and predetermined head of liquid in said separating chamber.

4. A liquid and contact device comprising a plurality of sections, each comprising a pump formed within a section, a vapor conduit directed to said pump, and a liquid container, means for maintaining a uniform and predetermined head of liquid in said container, means for introducing vapors from said pump into said liquid container and into the liquid contained therein, a vapor conduit from said container, means for introducing the liquid to said container and means for removing liquid from said container.

5. A vapor and liquid contact device comprising a plurality of substantially identical sections, each section comprising a mechanically operated vapor pump, means for operating said pump from a source of power, means for directing vapor from one section to the next upper section, means for directing liquid from the next upper section to the next lower section.

6. A liquid and vapor contact device, comprising an annular separating chamber, a plurality of stationary nozzles positioned in said chamber, a rotor comprising a plurality of nozzles co-operating with said stationary nozzles, means for withdrawing vapor from said separating chamber and a liquid downflow pipe for maintaining a uniform and predetermined head of liquid in said chamber.

Signed at Los Angeles, in the county of Los Angeles, and State of California, this 31st day of August, A. D. 1927.

PHILIP SUBKOW.